Figure 1:
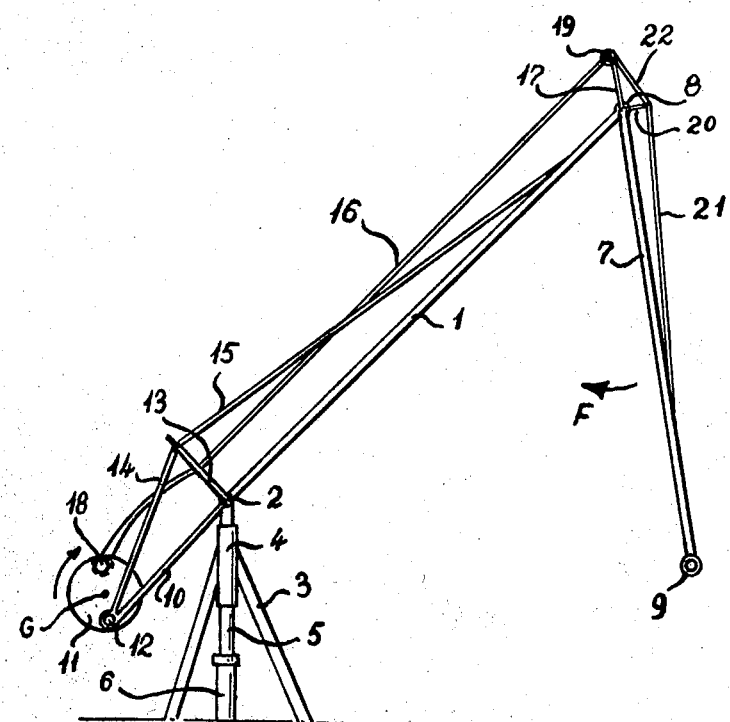

United States Patent

[11] 3,554,231

| [72] | Inventor | Cesare Caregnato |
| | | 36/D Via Arrigo Beito, Genoa-Pegli, Italy |
| [21] | Appl. No. | 740,595 |
| [22] | Filed | June 27, 1968 |
| [45] | Patented | Jan. 12, 1971 |
| [32] | Priority | July 4, 1967 |
| [33] | | Italy |
| [31] | | No. 7132A/67 |

[54] COUNTERPOISED SELF-BALANCING FLUID-TRANSFER SWIVEL JOINTED RIGID-PIPING CONNECTION
1 Claim, 2 Drawing Figs.

| [52] | U.S. Cl. | 137/615 |
| [51] | Int. Cl. | B67d 5/00 |
| [50] | Field of Search | 137/276, 279, 615; 248/123, 280, 364; 248/281 |

[56] References Cited
UNITED STATES PATENTS

| 2,470,284 | 5/1949 | Bergmans et al. | 248/280 |
| 3,085,593 | 4/1963 | Sorenson | 137/615 |
| 3,096,797 | 7/1963 | Bily | 137/615X |

FOREIGN PATENTS

| 249,126 | 5/1963 | Australia | 137/615 |

Primary Examiner—Robert G. Nilson
Attorney—B. P. Fishburne, Jr.

ABSTRACT: A fluid transfer piping comprising a swinging rigid pipe section fulcrumed to and connected by means of a swivel joint onto a stand pipe, a supplementary pipe section connected by a swivel joint to the free end of said swinging pipe section, a counterpoise pivotably supported eccentrically on a cantilever arm extending from said stand pipe, and connecting members connecting said counterpoise and said swinging pipe sections so that by swinging the swiveling pipe sections with respect to the stand pipe and to one another, the counterpoise is rotated so as to always substantially balance the varying momentum of the swiveling rigid pipe sections.

PATENTED JAN 12 1971  3,554,231

INVENTOR
Cesare Caregnato

BY  B. P. Fishburn, Jr.
ATTORNEY

COUNTERPOISED SELF-BALANCING FLUID-TRANSFER SWIVEL JOINTED RIGID-PIPING CONNECTION

This invention relates to heavy-piping connections, and particularly to a rigid-piping connection between a spout fitted on the main or a branch pipe of a fluid piping, such as a pipeline or the mains of waterworks, and a charging and discharging spout of the tanks of a tanker ship.

The object of the invention is to provide a fluid-transfer piping comprising a swinging rigid pipe section fulcrumed by means of a swivel joint onto a stand pipe connected to the spout of a pipeline, a hydrant or the like and one or more supplementary pipe sections connected by swivel joints to the end of the said preceding rigid pipe section and provided with extensions to which one end of connecting rods may be articulated, while the opposite end of said connecting rod or rods may be pivotally connected, directly or indirectly, to a swinging part of an eccentrically rotatable counterpoise, pivotally mounted on a short arm constituting the extension of the first rigid pipe fulcrumed on the top end of the said stand pipe.

The invention aims at providing such an arrangement of hinged rigid pipes and pipe extensions and of connecting members, as to form, together with a rigid arm constituted by the same preferably cylindrical counterpoise, taken between two diametrically opposite spaced axes, an articulated parallelogram adapted to control the eccentrically mounted counterpoise so as to always balance the system of fulcrumed balanced system of pipe sections hinged together by means of swivel joints.

The just-disclosed self-balancing rigid pipe system may be further reinforced by a strut- and tie rod arrangement.

The thus reinforced rigid pipe system is particularly designed for the charging and discharging of tanker ships, by connecting the end nipple of the last rigid pipe section to a spout of a tanker's tank, whose height and distance from the stand pipe may considerably vary during the discharging operations (for example of the ballast water) and the subsequent charging operation (for example of the oil) at the oil-charging harbor and vice versa at the pipeline terminal, on a quay or pier.

Figure 2:
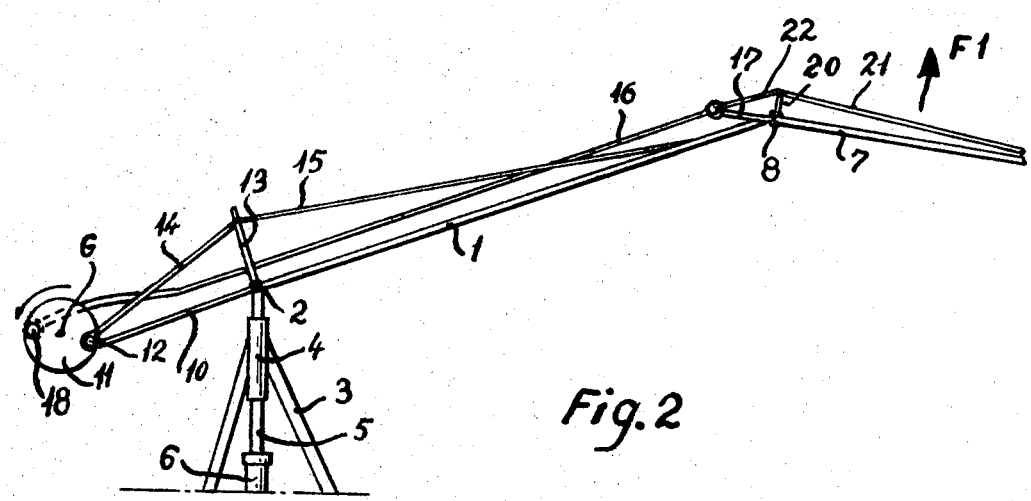

Other objects of the invention and the advantages inherent thereto will be apparent from the following specification of one preferred embodiment of the invention, shown by way of nonlimiting example in the accompanying drawings, in which:

FIG. 1 diagrammatically shows, in elevation, a counterpoised self-balancing rigid-pipe connection, fulcrumed by means of a swivel joint on a stand pipe and provided with a hinged extension, in retracted position; and FIG. 2 is a view similar to the view of FIG. 1 with the hinged extension in an outstretched position.

Referring to the drawings, the rigid-pipe connection for the transfer of liquids, particularly adapted for the loading and the unloading of tankers and like vessels, comprises a rigid pipe section 1 fulcrumed by means of a swivel joint 2 on a stand pipe 5 so as to oscillate in a vertical plane. The stand pipe is connected by a swivel joint 6 to a spout (not shown) mounted on the end of a piping to which oil may be transferred and/or water (particularly ballast water) may be drawn. The stand pipe 5 is rotatably supported in a vertical sleeve 4 forming part of a trestle 3 supporting the rigid overhanging pipe 1 and adjoining pipe section 7 connect to pipe section 1 by swivel joint 8.

The axes of rotation of swivel joints 2 and 8 are horizontal, so that the pipe sections 1 and 7 may oscillate on the same vertical plane. At the free end of rigid pipe section 7, a nipple 9 or a jointing flange may be fitted for the coupling of said pipe section to a further pipe section, or to a spout of a tank or the like.

Thus the rigid pipes 1 and 7 constitute a distributed-load cantilever swingably mounted on swivel joint 2 onto a stand pipe 5 and adapted to swing in a vertical plane about joints 2 and 8. This enables of coupling the piping to any desired loading or discharging spout arranged onto a vessel or a tank truck or other tanks, within wide limits independently from how the said spout is positioned, both as to height and distance, while it permits to the vessel, during its loading and unloading, of being, up to a certain extent, displaced.

As it is apparent from FIGS. 1 and 2, the rigid pipe section 1 presents at its end connected to the stand pipe 5 by joint 2 an oppositely projecting arm 10 on the end of which a preferably cylindrical counterpoise 11 is eccentrically rotatably mounted onto the pivot 12. Arm 10 is provided with a strut 13 extending substantially at right angles thereto and hinged pipe section 7 is provided with a strut 20 extending substantially at right angles thereto. Reinforcing tie rod 14 fastened to the counterpoised end of arm extension 10 and to the free end of strut 13 and tie rod 15 fastened to the same end of strut 13 and to the overhanging end of pipe 1 form a stiffening and reinforcing frame. Pipe section 7 is also provided with a rearwardly extending arm 17 between the end of which and the end of strut 20 a reinforcing tie rod 22 is fastened. A like reinforcing tie rod 21 is fastened between the end of strut 20 and the outer end of pipe section 7.

The preferably cylindrical counterpoise 11 having its center axis at G and hinged eccentrically at 12 to the rear end of arm 10 is hingedly connnected rod in a diametrically opposite position 18 to one end of a connecting rod 16 the other end of which is hingedly connected to the free end of the rear extension arm 17 of the pipe section 7.

Thus the pipe 1 with its rear extension 10 and the connecting rod 16 constitute two opposite sides of an articulated parallelogram the other two sides of which are constituted by the strut 17 and the arm incorporated in the counterpoise 11 between the pivots 12 and 18. Thus the counterpoise 11 comes to be incorporated in the said parallelogram and performs the double function of being one side of the parallelogram, of being a self-adjusting counterpoise by varying the position of its gravity center G. Thus, for example, when the pipe section 7 is swung inwardly (in the direction of arrow F, FIG. 1) the counterpoise 11 is rotated clockwise, thus reducing its balancing moment, which thus comes to be always automatically proportioned to the resultant of the cantilever moments of the system of the articulated arms 1 and 7, with respect to the same axis, so that any relative angular position of these arms is always a position of stable equilibrium of the system, and the passage from a position of equilibrium to another one, needs but that effort which is the minimum required to overcome the frictional resistances of the swivel joints. The latter is a particularly advantageous characteristic feature, not only in that it reduces down to the minimum the manual effort needed for handling the pipe system, but also because it immediately counteracts any stress which might be originated for example by a rough pitching movement of an oil tanker being loaded or unloaded.

I claim:

1. A device for transferring fluid from a relatively stationary stand pipe to a remote intake pipe which is unstable and subject to movement, said device comprising a main pipe section pivotally connected with the stand pipe and communicating therewith in all adjusted positions and projecting beyond one side of the stand pipe, a rigid arm extension on the main pipe section projecting beyond the other side of the stand pipe, an auxiliary pipe section pivoted to the main pipe section near the free end of the latter and communicating with the main pipe section in all adjusted position, said auxiliary pipe section projecting beyond one side of the pivot thereof, a rigid arm extension on the auxiliary pipe section projecting beyond the other side of the pivot thereof, a counterpoise weight pivoted eccentrically to the rigid arm extension of the main pipe section, and a connecting rod extending between the counterpoise weight and the rigid arm extension of the auxiliary pipe section and being pivoted to the rigid arm extension of the auxiliary pipe section and also being pivotally connected to the counterpoise weight at a point substantially diametrically opposite the pivotal connection of the weight with the rigid arm extension of the main pipe section, to thereby form a parallelogram linkage with the counterpoise weight itself constituting one arm of the linkage.